United States Patent
Lv

(10) Patent No.: US 9,632,366 B2
(45) Date of Patent: Apr. 25, 2017

(54) MASK AND METHOD OF MANUFACTURING PHOTORESIST SPACERS WITH THE MASK

(71) Applicant: SHENZHEN CHINA STAR OPTOELECTRONICS TECHNOLOGY CO., LTD, Shenzhen (CN)

(72) Inventor: Qibiao Lv, Shenzhen (CN)

(73) Assignee: SHENZHEN CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 290 days.

(21) Appl. No.: 14/404,639

(22) PCT Filed: Sep. 18, 2014

(86) PCT No.: PCT/CN2014/086826
§ 371 (c)(1),
(2) Date: Dec. 1, 2014

(87) PCT Pub. No.: WO2016/033833
PCT Pub. Date: Mar. 10, 2016

(65) Prior Publication Data
US 2016/0266430 A1    Sep. 15, 2016

(30) Foreign Application Priority Data
Sep. 5, 2014   (CN) .......................... 2014 1 0449673

(51) Int. Cl.
G02F 1/1339    (2006.01)
G02F 1/1333    (2006.01)

(52) U.S. Cl.
CPC ........ *G02F 1/13394* (2013.01); *G02F 1/1333* (2013.01); *G02F 2001/13398* (2013.01)

(58) Field of Classification Search
CPC .................................................. G02F 1/13394
See application file for complete search history.

(56) References Cited

U.S. PATENT DOCUMENTS

| | | | |
|---|---|---|---|
| 2007/0002259 A1 | 1/2007 | Ryu et al. | |
| 2013/0183612 A1 | 7/2013 | Sawayama | |

FOREIGN PATENT DOCUMENTS

| | | | | |
|---|---|---|---|---|
| CN | 1888962 A | | 1/2007 | |
| CN | 102645793 A | | 6/2012 | |
| CN | 102645793 A | * | 8/2012 | |
| CN | 102819161 | | 12/2012 | |
| CN | 103140797 A | * | 6/2013 | .............. G03F 1/00 |
| JP | 2009271491 A | | 11/2009 | |

* cited by examiner

*Primary Examiner* — Joseph L Williams
(74) *Attorney, Agent, or Firm* — Mark M. Friedman

(57) ABSTRACT

A mask and a method of manufacturing photoresist spacers with the mask are provided. The method includes: using the mask to expose and develop to a coated negative resist material, so as to form at least one sub photoresist spacer with at least one predetermined height, wherein an area of the shading portion of the first penetration region is determined according to the predetermined height of the sub photoresist spacer. Using the mask and the method of manufacturing photoresist spacers with the mask, different heights of the sub photoresist spacers can be obtained.

20 Claims, 3 Drawing Sheets

MASK AND METHOD OF MANUFACTURING PHOTORESIST SPACERS WITH THE MASK

FIELD OF THE INVENTION

The present invention relates to a technological field of liquid crystal displays, and more particularly to a mask and a method of manufacturing photoresist spacers with the mask.

BACKGROUND OF THE INVENTION

A thin film transistor liquid crystal display is assembled by two upper/lower glass substrates, wherein the upper glass substrate is a color filter substrate. The final step in the process of manufacturing the liquid crystal display is to manufacture photoresist spacers on the substrate. The function of the photoresist spacers is to support the upper/lower substrates to form a gap for filling liquid crystal.

The injecting quantity of liquid crystal for a display is constant. If the gap is too large, it will causes the gap to not be entirely filled with liquid crystal, and affects the display effect of the display; if the gap is too small, the penetration rate of a display panel is directly decreased, and the performance of the display panel is decreased therewith. Therefore, the gap between the upper and lower substrates has to be precisely controlled.

With the resolution of the display becoming higher and the pixels becoming smaller, there is not enough space to dispose the photoresist spacers towards the array substrate, so that it is necessary to manufacture sub photoresist spacers with different heights, so as to increase the uniformity of the gap between the glass substrates, and further to improve the display effect of the display.

Hence, it is necessary to provide a mask and a method of manufacturing photoresist spacers with the mask, so as to solve the problems existing in the conventional technologies.

SUMMARY OF THE INVENTION

One of the objects of the present invention is to provide a mask and a method of manufacturing photoresist spacers with the mask, so as to increase the uniformity of the gap between glass substrates, and further to improve the display effect of a display.

For solving the above-mentioned technological problem, the present invention constructs a method of manufacturing photoresist spacers with a mask, wherein the mask comprises at least one first penetration region, and the first penetration region comprises at least one shading portion;

wherein the method of manufacturing photoresist spacers comprises:

coating a negative resist material on a surface of a substrate of a liquid crystal display;

using the mask to expose the negative resist material;

developing the exposed negative resist material to form at least one sub photoresist spacer with at least one predetermined height;

wherein an area of the shading portion of the first penetration region is determined according to the predetermined height of the sub photoresist spacer; and the shading portion comprises a first shading portion and a second shading portion of the same areas and shapes; and wherein the height of the photoresist spacer is in inverse proportion to the area of the shading portion.

In the method of manufacturing photoresist spacers with the mask according to the present invention, the area ranges of the first shading portion and the second shading portion both are from 1 to 100 square micrometers.

In the method of manufacturing photoresist spacers with the mask according to the present invention, the area sum of the first shading portion and the second shading portion is from 30% to 40% of the area of the first penetration region.

In the method of manufacturing photoresist spacers with the mask according to the present invention, a distance between the first shading portion and the second shading portion is from 1 to 10 micrometers, so as to ensure that the surfaces of the photoresist spacers are smooth.

In the method of manufacturing photoresist spacers with the mask according to the present invention, the mask comprises at least two of the first penetration regions; and wherein areas of the shading portions of the at least two of the first penetration regions are different, so as to form the sub photoresist spacers with at least two heights.

In the method of manufacturing photoresist spacers with the mask according to the present invention, the mask comprises a second penetration region which is used to form a main photoresist spacer.

The present invention constructs a method of manufacturing photoresist spacers with a mask, wherein the mask comprises at least one first penetration region, and the first penetration region comprises at least one shading portion;

wherein the method of manufacturing photoresist spacers comprises:

coating a negative resist material on a surface of a substrate of a liquid crystal display;

using the mask to expose the negative resist material;

developing the exposed negative resist material to form at least one sub photoresist spacer with at least one predetermined height;

wherein an area of the shading portion of the first penetration region is determined according to the predetermined height of the sub photoresist spacer.

In the method of manufacturing photoresist spacers with the mask according to the present invention, the height of the photoresist spacer is in inverse proportion to the area of the shading portion.

In the method of manufacturing photoresist spacers with the mask according to the present invention, the shading portion comprises a first shading portion and a second shading portion of the same areas and shapes.

In the method of manufacturing photoresist spacers with the mask according to the present invention, the area ranges of the first shading portion and the second shading portion both are from 1 to 100 square micrometers.

In the method of manufacturing photoresist spacers with the mask according to the present invention, the area sum of the first shading portion and the second shading portion is from 30% to 40% of the area of the first penetration region.

In the method of manufacturing photoresist spacers with the mask according to the present invention, a distance between the first shading portion and the second shading portion is from 1 to 10 micrometers, so as to ensure that the surfaces of the photoresist spacers are smooth.

In the method of manufacturing photoresist spacers with the mask according to the present invention, the mask comprises at least two of the first penetration regions; and wherein areas of the shading portions of the at least two of the first penetration regions are different, so as to form the sub photoresist spacers with at least two heights.

In the method of manufacturing photoresist spacers with the mask according to the present invention, the mask comprises a second penetration region which is used to form a main photoresist spacer.

Another one of the objects of the present invention is to provide a mask which comprises at least one first penetration region, wherein the first penetration region is used to form a sub photoresist spacer; the first penetration region comprises at least one shading portion; and an area of the shading portion of the first penetration region is determined according to a predetermined height of the sub photoresist spacer.

In the mask according to the present invention, the shading portion comprises a first shading portion and a second shading portion of the same areas and shapes.

In the mask according to the present invention, the area ranges of the first shading portion and the second shading portion both are from 1 to 100 square micrometers.

In the mask according to the present invention, the area sum of the first shading portion and the second shading portion is from 30% to 40% of the area of the first penetration region.

In the mask according to the present invention, a distance between the first shading portion and the second shading portion is from 1 to 10 micrometers, so as to ensure that the surfaces of the photoresist spacers are smooth.

In the mask according to the present invention, the height of the photoresist spacer is in inverse proportion to the area of the shading portion.

In the mask of the present invention and the method of manufacturing photoresist spacers with the mask, by disclosing different areas of the shading portions on the first penetration region, different heights of the sub photoresist spacers can be obtained, so as to increase the uniformity of the gap between the glass substrates, and further to improve the display effect of the display.

DETAILED DESCRIPTION OF THE PREFERRED EMBODIMENTS

Figure 1:
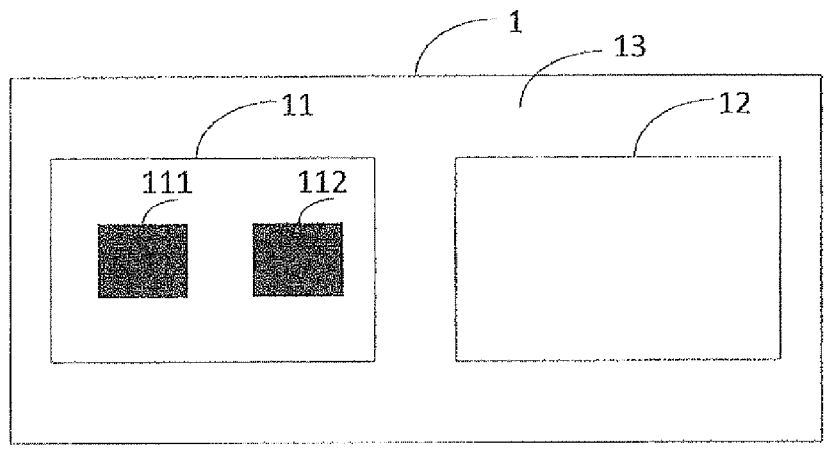
FIG. 1 is a structural schematic view of a section of a mask according to the present invention.

The foregoing objects, features, and advantages adopted by the present invention can be best understood by referring to the following detailed description of the preferred embodiments and the accompanying drawings. Furthermore, the directional terms described in the present invention, such as upper, lower, front, rear, left, right, inner, outer, side, and etc., are only directions with reference to the accompanying drawings, so that the used directional terms are used to describe and understand the present invention, but the present invention is not limited thereto. In the drawings, units with similar structures use the same numerals.

Refer now to FIG. 1, which is a structural schematic view of a section of a mask according to the present invention.

A mask of the present invention is as shown in FIG. 1. The mask 1 comprises a first penetration region 11; a second penetration region 12; and a non-penetration region 13 (the portion excluding the first penetration region and the second penetration region). The first penetration region 11 comprises at least one shading portion 111 or 112, wherein the shading portion(s) can be one, two, or more than two. The first penetration region 11 is used to form a sub photoresist spacer; and the second penetration region 12 is used to form a main photoresist spacer.

When using the mask of the present invention, by disposing the shading portion on the first penetration region 11 and adjusting the area of the shading portion, different heights of sub photoresist spacers are obtained.

Figure 2:
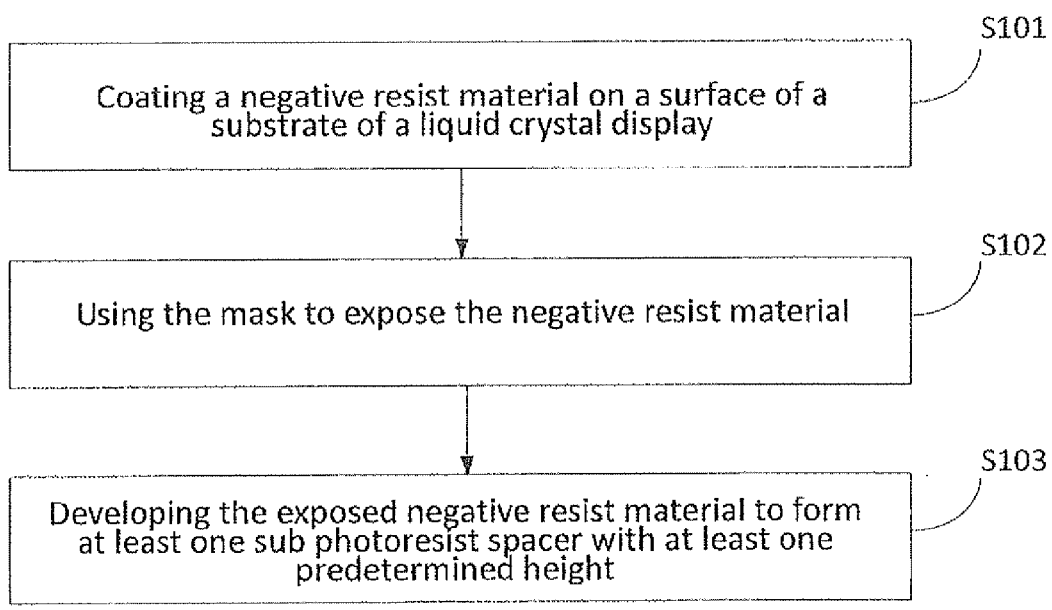
FIG. 2 is a flow chart of a method of manufacturing photoresist spacers with the mask according to the present invention.

Before manufacturing the photoresist spacers, according to a predetermined height of the sub photoresist spacer, the area of the shading portion of the first penetration region is determined. The photoresist spacer is made by the mask with a preinstalled area of the shading portion. A specific manufacturing process is as shown in FIG. 2:

S101: coating a negative resist material on a substrate of a liquid crystal display; wherein a spin coating method is possibly adopted to coat the negative resist material;

S102: using the mask to expose the negative resist material; wherein by exposure operation, light rays pass through the first penetration region of the mask to light the substrate coated with the negative resist material, and finally a pattern formed by the penetration region of the mask is transferred onto the substrate, which can be a glass substrate;

S103: developing the exposed negative resist material to form a photoresist spacer with a predetermined height.

Because of the molecular structure of the lighted portion of the negative resist material is changed when in step S102, it does not react with a developing solution when in the developing process of the step S103. However, regarding the negative resist material disposed the shading portion, the shading portion can lower the intensity of the light rays which light on the negative resist material through the mask, so that the negative resist material (the portion corresponding with the shading portion) which gets a lower intensity of the light rays are easily dissolved with the developing solution. Therefore, compared with the main photoresist spacer formed by the penetration region without shading portion, the height of the sub photoresist spacer formed by the penetration region with shading portion is lower. In the method, by installing different areas of the shading portions on the first penetration region 11 of the mask 1, sub photoresist spacers with different heights are produced. If two of the shading portions are adopted, a diffraction effect can be produced in the lighting process. The diffraction effect of light rays is a phenomenon in which, during the transmission of a light rays, when meeting an obstacle or a small hole, the light rays will bypass the obstacle deviating from the original straight transmission. The diffraction effect can redistribute the intensity of the light rays after the shading portion, so that it is different from the intensity distribution of light rays by geometric optics, and also different from the intensity distribution of light rays by free transferring light waves. That is, by the diffraction effect of light rays, the negative resist material under the pattern which is formed on the substrate by the shading portions can be lighted too, so that the surface of the sub photoresist spacer does not leave holes. Preferably, the intensity of the diffraction effect can be changed by adjusting the area size of the shading portion.

Figure 3:
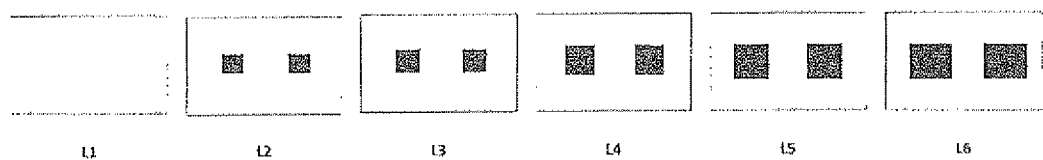
FIG. 3 is a penetration region of the mask of the present invention.

A plurality of experiments for one of the penetration region with two of the shading portions installed has been implemented. As shown in FIG. 3, a series (L1-L6) of the same size penetration regions are designed. All of the penetration regions are formed as a rectangle, the length thereof is 25 um and the width thereof is 10 um; and each of the penetration regions of L2-L6 is provided with two of the square shading portions with the same area. The penetration region of L1 is not provided with shading portions, and L1 is used for manufacturing a main photoresist spacer. The area sum of the two of the shading portions of L2-L6 is gradually increased, and L2-L6 are used for manufacturing sub photoresist spacers with different heights.

It should be noted that, since the material of the photoresist spacer is a negative resist material, the shading portion of the penetration region of the mask is opaque, but the other portions of the penetration region is pervious to the light rays. The specific experiment parameters are designed as Tab. 1.

fore, the height of the photoresist spacer can be lowered by increasing the area of the shading portion.

Figure 4:
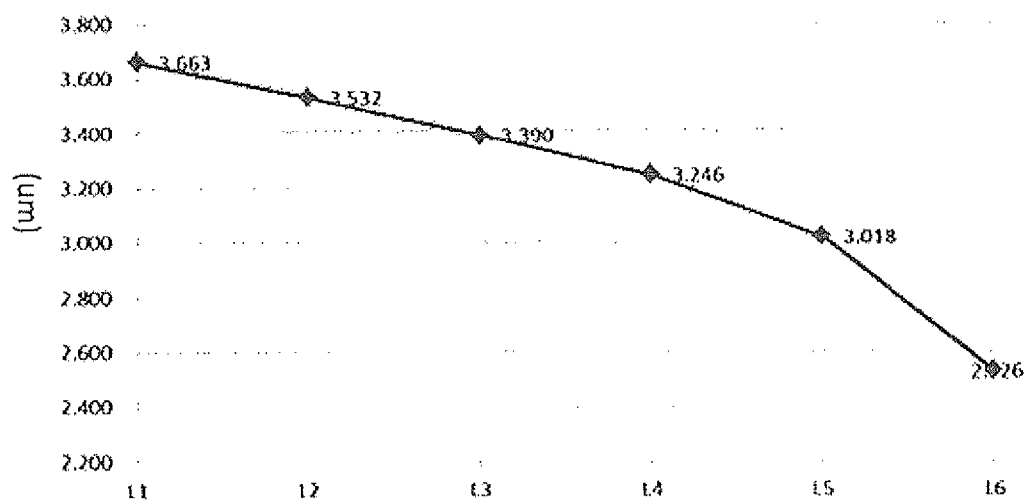
FIG. 4 is a diagram showing a variation of that different areas of shading portions of the mask with heights of the photoresist spacers according to the present invention.
Figure 5:
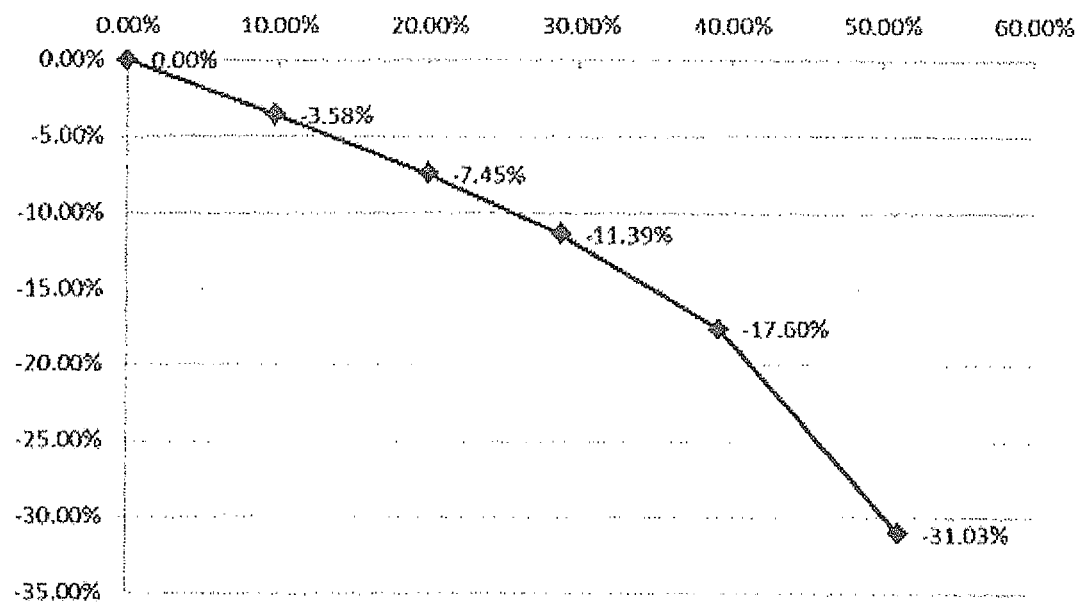
FIG. 5 is a variation diagram showing a variation of the increasing range of the shading portions with the percentage of the shading portions occupying the penetration region according to the present invention.

Referring now to FIG. 4 and FIG. 5, FIG. 4 shows a changing trend when the areas of shading portions of the mask are changed with the heights of the photoresist spacers. In this figure, the X-coordinate is the types of penetration regions; the Y-coordinate is the heights of the photoresist spacers; and the unit is micrometers. With the increasing of the area sum of the shading portions, the heights of the photoresist spacers are lower.

FIG. 5 shows a changing trend of the increasing range of the shading portions with the percentage of the shading portions occupying the penetration region. In this figure, the X-coordinate is the percentages of the area sum of the shading portions dividing the area of penetration regions; and the Y-coordinate is the increasing range of heights of the photoresist spacers. With the increasing of the percentages of the area sum of the shading portions dividing the area of penetration regions, the increasing range of heights of the photoresist spacers have a decreasing trend, namely a negative growing up, and the increasing range is lower.

Figure 6:
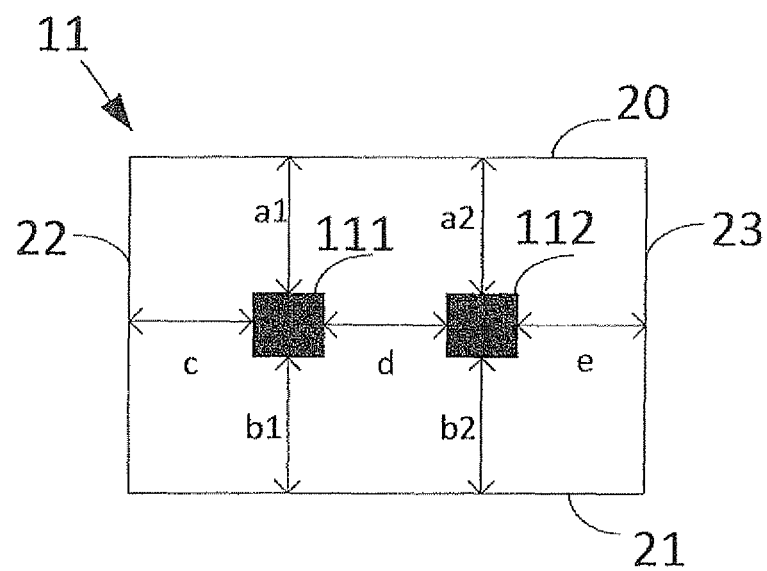
FIG. 6 is a preferable structural schematic view of a first penetration region of the mask according to the present invention.

Preferably, refer now to FIG. 6, which is preferable structural schematic view of a first penetration region of the mask according to the present invention. When the first

TABLE 1 experiment parameters for design of photoresist spacers

| | Type of penetration regions | | | | | |
|---|---|---|---|---|---|---|
| | L1 | L2 | L3 | L4 | L5 | L6 |
| Size of penetration regions (um) | 10 × 25 | | | | | |
| Size of single shading portion (um$^2$) | None | 3.5 × 3.5 | 5 × 5 | 6 × 6 | 7 × 7 | 8 × 8 |
| Area sum of shading portions (um$^2$) | 0 | 24.5 | 50 | 72 | 98 | 128 |
| Percentages of area sum of shading portions dividing area of penetration regions (%) | 0% | 9.80% | 20.00% | 28.80% | 39.20% | 51.20% |
| Heights of photoresist spacers (um) | 3.663 | 3.531 | 3.390 | 3.245 | 3.0183 | 2.526 |
| Increasing range of height of photoresist spacers (%) | 0% | −3.58% | −7.45% | −11.39% | −17.60% | −31.03% |

Each group of the above-mentioned experiment has been implemented under the same processing conditions. According to the experimental data of Tab. 1, it has been found that with increasing the area sum of the shading portion, the heights of the photoresist spacers are decreased. If the mask has been designed such that the first penetration region is provided with shading portions, of the increased area of the shading portion will cause the lower height of the photoresist spacers, so that it can be understood the height of the photoresist spacer is in inverse proportion to the area of the shading portion. The principle is that if the area of shading portion is larger during exposure, the intensity of the light rays which light on the negative resist material through a mask can be lower, so that the negative resist material corresponding with the shading portion has more portions to be dissolved with the developing solution, and then the height of the photoresist spacer is lower therewith. There-penetration region 11 is a rectangle, the first shading portion 111 and the second shading portion 112 are rectangles or squares. Certainly, the first penetration region can be other shapes, such as a circle. The first penetration region 11 comprises a pair of parallel long sides and a pair of parallel short sides. A distance a1 from the first shading portion 111 to the long side 20 thereupon is equal to a distance b1 from the first shading portion 111 to the long side 21 thereunder; and a distance a2 from the second shading portion 112 to the long side 20 thereupon is equal to a distance b2 from the second shading portion 112 to the long side 21 thereunder.

A distance c is from the first shading portion 111 to the closest short side 22; a distance d is between the first shading portion 111 and the second shading portion 112; and a distance e is from the second shading portion 112 to the closest short side 23. The above-mentioned three distances are equal.

When the first penetration region is a circle, the first shading portion 111 and the second shading portion 112 are circles. Certainly, the shading portions can be rectangles or squares or the other shapes; they are all adopted in the present invention. The first shading portion and the second shading portion are symmetrical with the center of, the circle, wherein the distance from the first shading portion to the closest edge of the penetration region, the distance between the first shading portion and the second shading portion (the distance between two closest points of the first shading portion and the second shading portion), and the distance from the second shading portion to the closest edge of the penetration region. The above-mentioned three distances are equal.

Preferably, the area ranges of the first shading portion and the second shading portion both are from 1 to 100 square micrometers. When the areas of the shading portions are in the above-mentioned range, the size of the shading portion is smaller than the exposing precision of the exposing machine, so as to ensure the surfaces of the photoresist spacers are smooth.

Preferably, the area sum of the first shading portion and the second shading portion is from 30% to 40% of the area of the first penetration region. When the area sum of the first shading portion and the second shading portion is in the above-mentioned range, the surfaces of the sub photoresist spacers do not leave holes.

Preferably, the distance between the first shading portion and the second shading portion is from 1 to 10 micrometers, so as to ensure that the surfaces of the photoresist spacers are smooth.

Preferably, the mask comprises at least two of the first penetration regions, wherein the shaded areas of the two shading portions of the at least two first penetration regions are different, so as to form at least two heights of the sub photoresist spacers to satisfy a requirement for manufacturing two different heights of sub photoresist spacers.

In the mask of the present invention and the method of manufacturing photoresist spacers with the mask, by disclosing different areas of the shading portions on the first penetration region, different heights of the sub photoresist spacers can be obtained, so as to increase the uniformity of the gap between the glass substrates, and further to improve the display effect of the display.

As described above, the present invention has been described with a preferred embodiment thereof and it is understood that many changes and modifications to the described embodiment can be carried out without departing from the scope and the spirit of the invention that is intended to be limited only by the appended claims.

The invention claimed is:

1. A method of manufacturing photoresist spacers with a mask, wherein the mask comprises at least one first penetration region, and the first penetration region comprises at least one shading portion;
wherein the method of manufacturing photoresist spacers comprises:
coating a negative resist material on a surface of a substrate of a liquid crystal display;
using the mask to expose the negative resist material;
developing the exposed negative resist material to form at least one sub photoresist spacer with at least one predetermined height;
wherein an area of the shading portion of the first penetration region is determined according to the predetermined height of the sub photoresist spacer; and the shading portion comprises a first shading portion and a second shading portion of the same area and shape; and
wherein the height of the photoresist spacer is in inverse proportion to the area of the shading portion.

2. The method of manufacturing photoresist spacers with the mask according to claim 1, wherein the area ranges of the first shading portion and the second shading portion both are from 1 to 100 square micrometers.

3. The method of manufacturing photoresist spacers with the mask according to claim 1, wherein the area sum of the first shading portion and the second shading portion is from 30% to 40% of the area of the first penetration region.

4. The method of manufacturing photoresist spacers with the mask according to claim 1, wherein a distance between the first shading portion and the second shading portion is from 1 to 10 micrometers, so as to ensure that the surfaces of the photoresist spacers are smooth.

5. The method of manufacturing photoresist spacers with the mask according to claim 1, wherein the mask comprises at least two of the first penetration regions; and
wherein areas of the shading portions of the at least two of the first penetration regions are different, so as to form the sub photoresist spacers with at least two heights.

6. The method of manufacturing photoresist spacers with the mask according to claim 1, wherein the mask comprises a second penetration region, which is used to form a main photoresist spacer.

7. A method of manufacturing photoresist spacers with a mask, wherein the mask comprises at least one first penetration region, and the first penetration region comprises at least one shading portion;
wherein the method of manufacturing photoresist spacers comprises:
coating a negative resist material on a surface of a substrate of a liquid crystal display;
using the mask to expose the negative resist material;
developing the exposed negative resist material to form at least one sub photoresist spacer with at least one predetermined height;
wherein an area of the shading portion of the first penetration region is determined according to the predetermined height of the sub photoresist spacer.

8. The method of manufacturing photoresist spacers with the mask according to claim 7, wherein the height of the photoresist spacer is in inverse proportion to the area of the shading portion.

9. The method of manufacturing photoresist spacers with the mask according to claim 7, wherein the shading portion comprises a first shading portion and a second shading portion of the same area and shape.

10. The method of manufacturing photoresist spacers with the mask according to claim 9, wherein the area ranges of the first shading portion and the second shading portion both are from 1 to 100 square micrometers.

11. The method of manufacturing photoresist spacers with the mask according to claim 9, wherein the area sum of the first shading portion and the second shading portion is from 30% to 40% of the area of the first penetration region.

12. The method of manufacturing photoresist spacers with the mask according to claim 9, wherein a distance between the first shading portion and the second shading portion is from 1 to 10 micrometers, so as to ensure that the surfaces of the photoresist spacers are smooth.

13. The method of manufacturing photoresist spacers with the mask according to claim 7, wherein the mask comprises at least two of the first penetration regions; and wherein areas of the shading portions of the at least two of the first penetration regions are different, so as to form the sub photoresist spacers with at least two heights.

14. The method of manufacturing photoresist spacers with the mask according to claim 7, wherein the mask comprises a second penetration region which is used to form a main photoresist spacer.

15. A mask comprising at least one first penetration region, wherein the first penetration region is used to form a sub photoresist spacer; the first penetration region comprises at least one shading portion; and an area of the shading portion of the first penetration region is determined according to a predetermined height of the sub photoresist spacer.

16. The mask according to claim 15, wherein the shading portion comprises a first shading portion and a second shading portion of the same area and shape.

17. The mask according to claim 16, wherein the area ranges of the first shading portion and the second shading portion both are from 1 to 100 square micrometers.

18. The mask according to claim 16, wherein the area sum of the first shading portion and the second shading portion is from 30% to 40% of the area of the first penetration region.

19. The mask according to claim 16, wherein a distance between the first shading portion and the second shading portion is from 1 to 10 micrometers, so as to ensure that the surfaces of the photoresist spacers are smooth.

20. The mask according to claim 15, wherein the height of the photoresist spacer is in inverse proportion to the area of the shading portion.

\* \* \* \* \*